D. P. Nickerson,
Cheese Press,
Nº 33,157.    Patented Aug. 27, 1861.
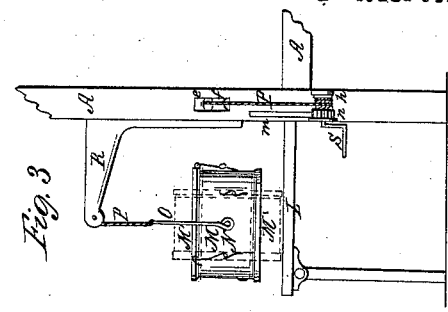
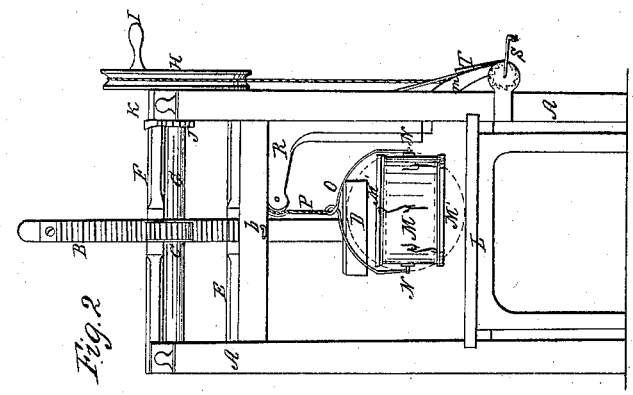
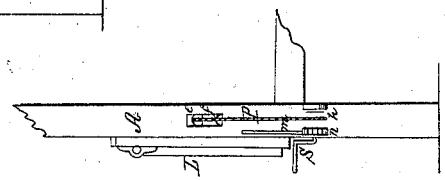
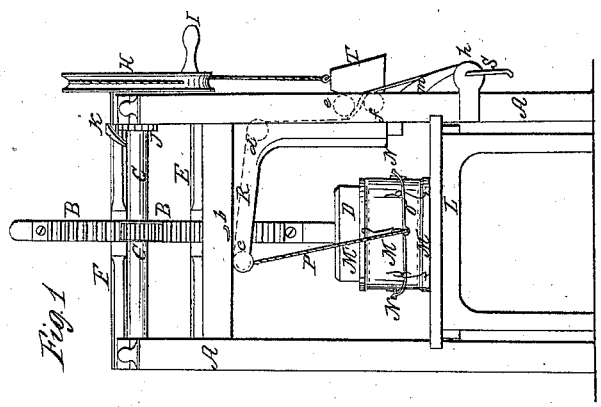
Witnesses    Inventor;

UNITED STATES PATENT OFFICE.

D. P. NICKERSON, OF CLEVELAND, OHIO.

IMPROVEMENT IN CHEESE PRESSES AND HOOPS.

Specification forming part of Letters Patent No. 33,157, dated August 27, 1861.

*To all whom it may concern:*

Be it known that I, D. P. NICKERSON, of Cleveland, in the county of Cuyahoga and State of Ohio, have invented certain new and useful Improvements in a Combined Cheese-Press and Adjustable Cheese-Hoop; and I do hereby declare that the following is a full and complete description of the construction and operation of the same, reference being had to the accompanying drawings, making a part of this specification, in which—

Figures 1 and 2 are end views. Figs. 3 and 4 represent a part of views of the side in different positions.

Like letters denote similar parts in the different views.

My improvement relates to a combined machine for pressing and turning cheese, whereby the cheese can be pressed with the application of little power simply by turning a crank and adjusting a weight, and when it is desired to turn the cheese remove the pressure, and the cheese-hoop can be brought out by turning another crank over an adjustable table, and the bail that suspends the hoop is connected to the sides of it in such a way that the hoop can be swung round vertically inside of the bail and the under side turned above. The hoop can then, by means of a crane and pulleys, be swung back again under the press.

In the different figures, A represents the frame of the machine, which may be of any suitable form.

B is a rack secured to the head D, moving in the guides E and F, that form a part of the frame.

C is a cog-wheel on the shaft G that works in the rack B and is connected to the wheel H, which is turned by the crank I.

J is a ratchet-wheel on the shaft, and K a pawl to stop the revolution of the shaft and keep the rack in any desired place.

L is an adjustable table hinged to the frame, that when not in use can be placed up against the frame and retained there by the hook b, the legs being turned down, as shown in Fig. 4. The object of this arrangement is to have the press occupy as little room as possible.

The cheese is placed in the hoop M between the followers (indicated by the dotted lines and the platens M') above and below that are hooked onto the hoop, as represented.

O is a bail connected to the two sides, about the middle of the hoop, by lugs N in such a way that the hoop can be swung entirely round inside of the bail, as represented by the dotted lines in Figs. 2 and 3. To the center of this bail is attached the rope P, that passes over the pulleys c and d (indicated in Fig. 1) in the crane R and down under the pulley e and over the pulley f in the frame, winding onto the pulley h, as seen in Figs. 3 and 4, that is turned by the crank S.

When the cheese is in the hoop, all ready for pressing, it is swung, by means of the crane R, under the press, and the bail is let down by the side, as shown in Fig. 1. It is then pressed, more or less, by turning the crank I, that forces down the head D, which is kept in place by the pawl K and ratchet J. An additional pressure is produced by the weight T, suspended to the wheel H, when it hangs down in the direction that the wheel is turned when pressing the cheese, as in Fig. 1.

When it is desired to turn the cheese, elevate the head D by reversing the motion of the wheel H and let down the table L, if it is up, as shown in Fig. 3. By turning the crank S the bail is brought up over the cheese-hoop, and the crane, with the hoop, is brought out and suspended over the table L. It can then be turned over inside of the bail, as indicated by the dotted lines, with the greatest ease and swung back again under the press. The cheese is thoroughly pressed, for the platens M' press the followers that pass inside of the hoop onto the cheese. With this arrangement of pressing and turning the cheese it is evident that a great amount of labor is saved, and the work is done in a shorter time and more thoroughly.

The cheese-hoop is kept suspended in any desired place by means of the pawl m and ratchet n, connected with the pulley h.

What I claim as my improvement, and desire to secure by Letters Patent, is—

The special arrangement of the hinge hoop M and bail O, crane R, and adjustable table L, in combination with the described cheese-press, when operating conjointly in the manner, and for the purpose as set forth.

D. P. NICKERSON.

Witnesses:
W. H. BURRIDGE,
A. McCLELLAND.